Patented Sept. 25, 1951

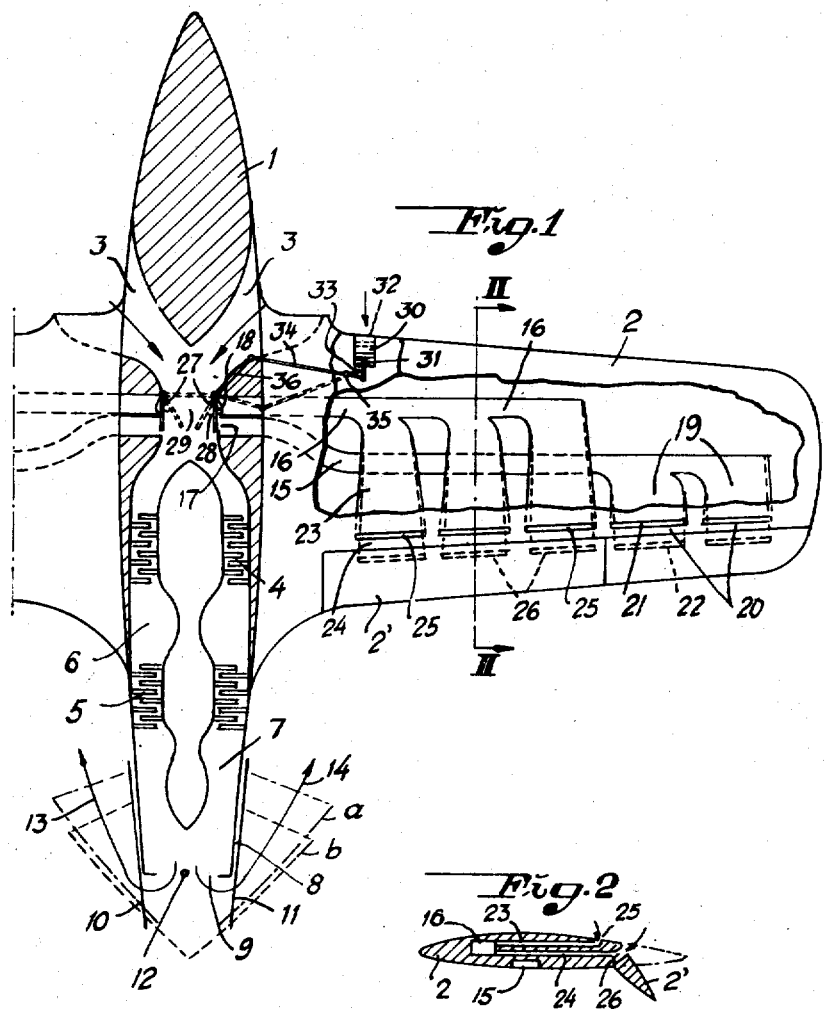

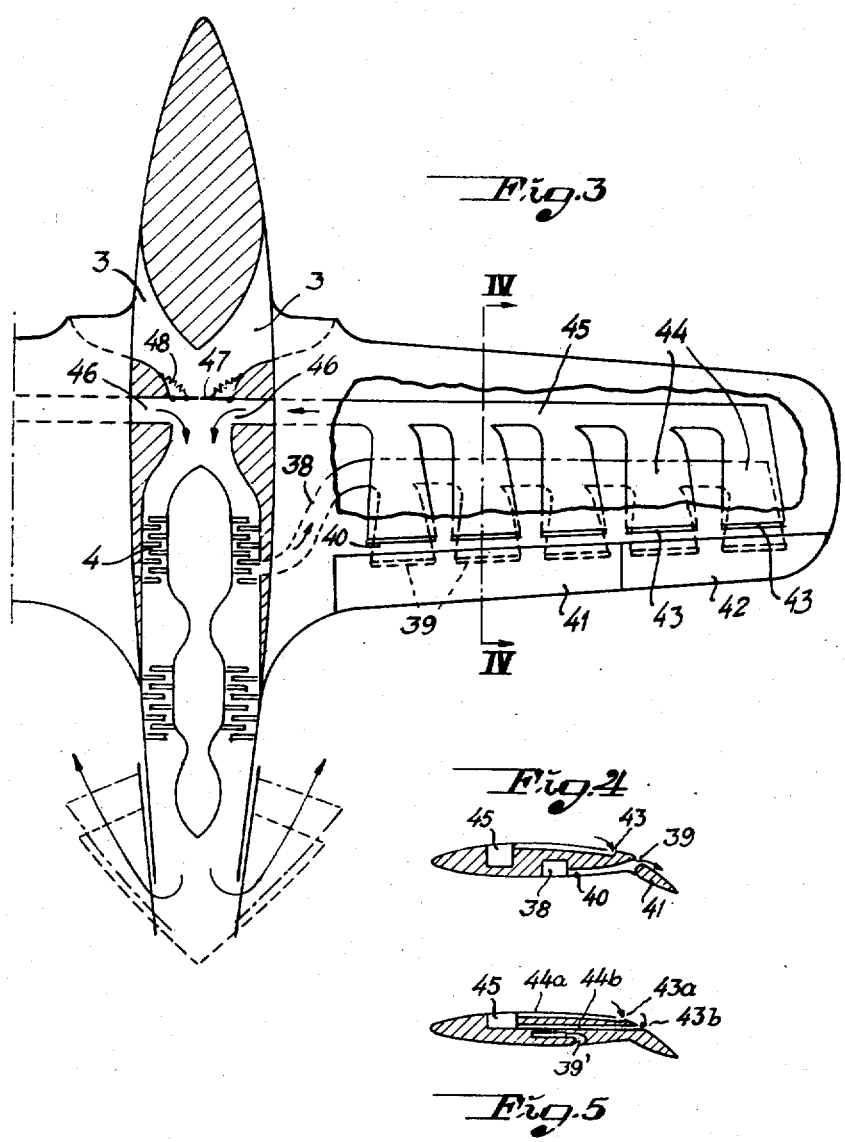

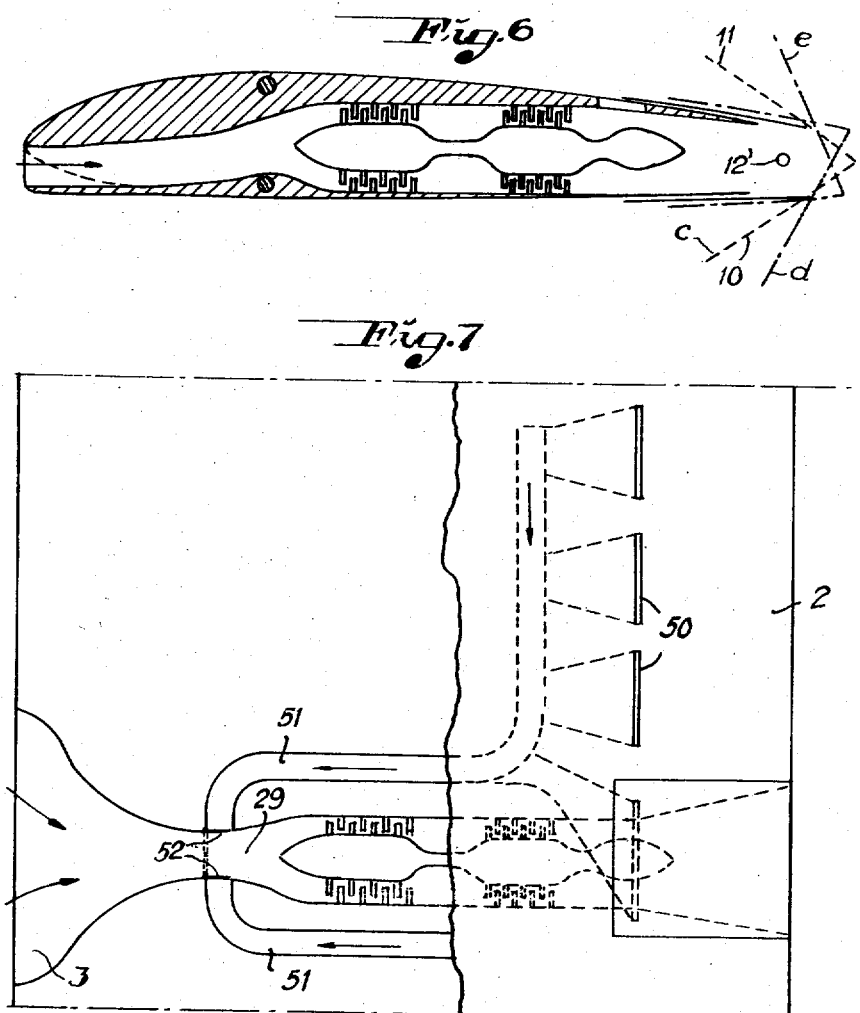

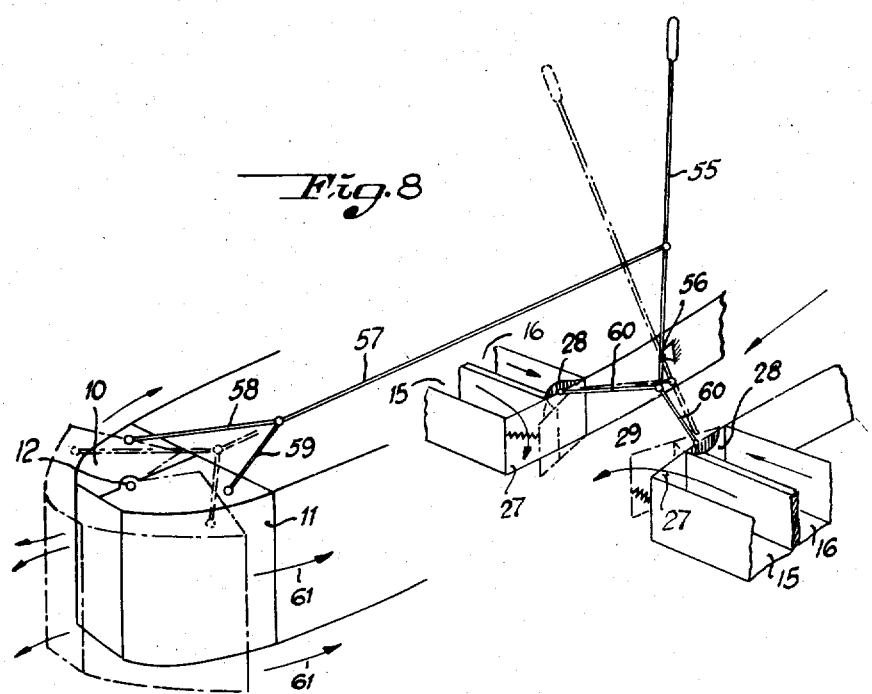
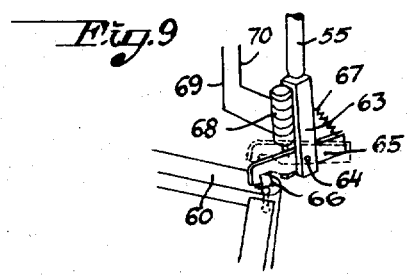

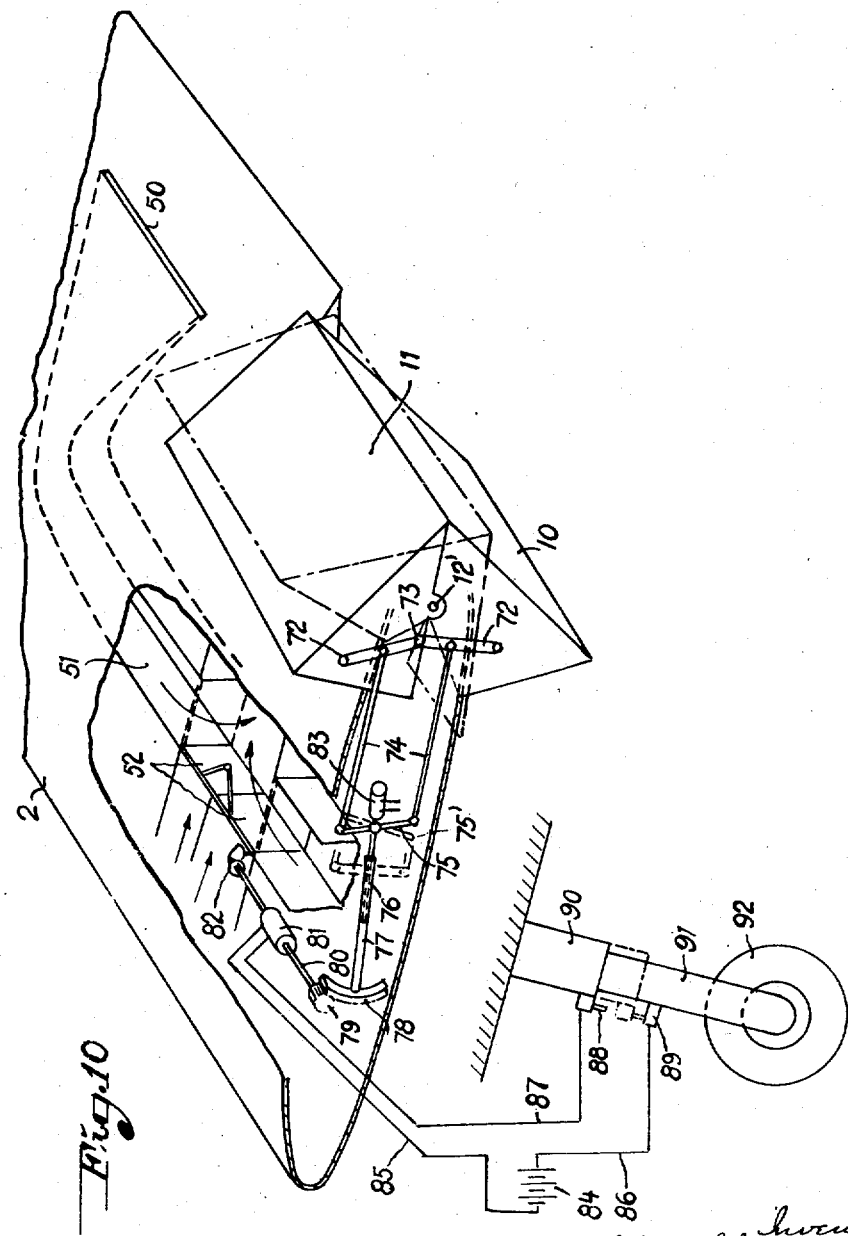

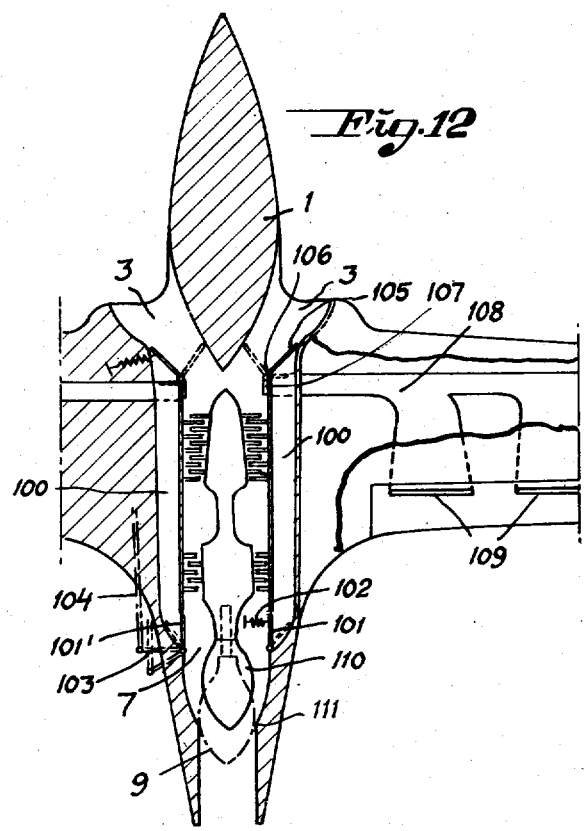
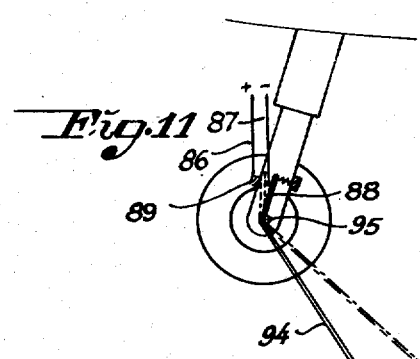

2,568,813

UNITED STATES PATENT OFFICE 2,568,813

JET-PROPELLED AIRCRAFT WITH BOUNDARY LAYER CONTROL

Bo Klas Oskar Lundberg, Appelviken, Sweden, assignor to Svenska Turbinfabriks Aktiebolaget Ljungstrom, Finspong, Sweden, a corporation of Sweden Application November 29, 1945, Serial No. 631,642
In Sweden September 28, 1945

21 Claims. (Cl. 244—40)

In reactive operation of aircraft, the facilities for improving the properties of the aircraft by boundary layer control are far greater per se than in air screw propulsion. In the practical application, certain difficulties are met with, however, particularly in regard to such sucking-off of the boundary layer that has for its object to increase the buoyancy of the wing at a low speed or to increase the maximum coefficient of buoyancy thereof for the purpose of reducing the speed in landing and thus the landing run required. In the sucking of air from the boundary layer with the aid of the source of power of the jet propulsion unit a propelling reaction force manifests itself at the same time, which is the force generated by the reaction gases ejected rearward from the unit, and this force should of course be reduced in flying for landing as well as during the actual touch-down manoeuvre, in order to reduce the speed as far as possible. In contradistinction to this, the unit should develop a large amount of energy to suck away the boundary layer on the same occasion. It is desirable, furthermore, that in flying for landing the gliding angle be comparatively steep, a propelling force being then also detrimental, inasmuch as it makes the gliding angle flatter.

The present invention has for its object to solve the problem of regulating the boundary layer by means of a jet propulsion unit or exhaust-gas-propelled-compressor plant at an aircraft at simultaneous reduction of the propelling reactive force to an arbitrary desired value, which may also be naught or negative, that is to say a value at the production of a rearward directed reaction force. The invention may be applied to aircraft having a jet propulsion unit with a turbine-driven compressor for the combustion air or with simple reaction tubes without any movable parts or with means comparable therewith. The substantially distinguishing feature of the invention is, above all, that the reaction unit or the like is arranged to control (accelerate, suck and/or blow off) the boundary layer of the aircraft—preferably that of the wings—and that the compressor or the like is adapted to be utilized for simultaneous reduction of the propelling reaction force or to bring about a braking reaction force. Means may be provided to reduce the propelling reaction force and to provide the braking reaction force, by which means the propelling gases generated by air from the compressor, which propelling gases are normally ejected rearward, are caused to flow out in other directions, for instance through laterally directed subordinate outlets. The latter means may consist of deflecting members adapted to deflect the gases from the jet propulsion unit in directions other than the normal one, for instance laterally or forwardly in the vertical direction or obliquely forward, and this deflecting member may be adjustable in such manner that the substantially rearward directed reaction force produced by the deflection may be varied from naught to a maximum value. It will be possible hereby to increase the buoyancy of the aircraft, while the propelling reaction force is reduced at the same time, or, the braking effect is at the same time exerted by the rearward directed reaction force. The effect of such reactive braking, which is desirable, above all, in connection with landing, but may be of importance also, for example for the reduction of the speed during ordinary flight, will be appreciably augmented by a simultaneous control of the boundary layer, partly because of the fact that the latter involves a lower stall limit, so that the reactive braking may be applied more powerfully and during a longer period, before any risk is incurred of the stalling of the aircraft, and partly for the reason that the wings entail a greater air resistance at said coefficient of buoyancy involved by the boundary layer control than without any boundary layer control.

Further features of the invention and advantages inherent therein will appear from the following description of forms of embodiment illustrated diagrammatically in the accompanying drawings. Fig. 1 shows the fuselage and one wing of an airplane with an arrangement according to a first embodiment of the invention in plan view and partly in section. Fig. 2 shows a cross section on line II—II in Fig. 1. Fig. 3 shows an airplane in the same manner as Fig. 1 but with an arrangement according to a second embodiment of the invention. Fig. 4 shows a cross section on line IV—IV in Fig. 3 and Fig. 5 a corresponding cross section according to a modified embodiment. Fig. 6 shows a wing in section at right angles to the plane of the wing, and Fig. 7 shows the wing in horizontal projection and partly in longitudinal section, said wing having a jet propulsion unit with an arrangement according to the invention built into the same. Fig. 8 is a perspective view of the controlling means for the reactive braking and the boundary layer control with operating members for the latter, and Fig. 9 likewise is a perspective view of a detail of the arrangement according to Fig. 8. Fig. 10 is a partially sectioned perspective view of operating means for a braking and boundary layer control device according to Figs. 6 and 7. Fig. 11 shows a modification of a detail of the arrangement according to Fig. 10. Fig. 12 illustrates a further embodiment in longitudinal section through an airplane.

Fig. 1 shows the invention as applied to an airplane having a jet propulsion unit arranged centrally on the fuselage 1 of an airplane, the wings of which are designated by 2. The jet propulsion unit is provided with front air-intakes 3, through which the air is supplied to the suction side of a compressor 4, which is driven by means of a turbine 5. Provided between the compressor 4 and the turbine 5 is a combustion chamber 6, wherein the combustion of fuel introduced into the same is effected by means of the air compressed by the compressor 4. The combustion gases escape rearward through an outlet passage 7 surrounded by the rear portion 8 of the fixed wall of the jet propulsion unit. This wall forms an outlet 9 for the gases.

The airplane is provided with means facilitating the utilization of the compressor for the control of the boundary layer of the wing and for reducing the propulsive reaction force, which is generated by the combustion gases rushing out in a rearward direction or for producing a braking reaction force. Means are provided to reduce the propelling reaction force and to produce the braking reactive effect, said means causing the gases escaping through the outlet 9 to flow out in other directions than rearward. According to Fig. 1, these means consist of a pair of deflector flaps 10, 11, which are mounted on the stationary wall 8 so as to permit of being swung about a vertical shaft 12. In normal flight, these flaps take the position shown by full lines, but they may also be extended into any of the positions a and b or other intermediate positions, whereby the gas stream is deflected sideways, entirely or in part, and obliquely forwards, as indicated by the arrows 13 and 14.

For the boundary layer control there are provided conduits 15, 16 in the wing, said conduits extending in the direction of the span from mouths 17 and 18 at the channel 29 extending from the air-intakes 3 to the suction side of the compressor 4 and outwardly. The conduit 15 extends outwardly on the outer part of the wing to a point adjacent to the outer end thereof, and it is provided with rearward directed branch conduits 19, 20 arranged in pairs above each other and opening into slots 21 and 22, respectively, arranged behind one another in the covering of the wing immediately in front of the rear edge of the wing. Similar branch conduits 23, 24 extend from the conduit 16 to slots 25 and 26, respectively, the latter being preferably arranged approximately in alignment with the slots 21, 22 but nearer to the fuselage than the latter slots. On the whole, the drawing only illustrates conduits and suction slots in the one wing, but it is obvious that similar means are to be provided in the other wing as well. Valve members or dampers 27 are provided at the mouths 17, 18 on each side of the passage 29 extending from the air-intakes 3, said dampers being adapted to be adjusted by means of any suitable contrivance in such manner as to be caused to open when air is to be sucked through the conduits 15, 16 from the boundary layer of the wing by means of the compressor 4. The passages 15, 16 have their mouths 17, 18 situated immediately adjacent to and behind each other, so that the latter may be controlled by means of a common damper. The latter is provided opposite the mouth 18 with a projecting part or valve body 28 which is within the mouth 18 when the damper is closed. When the damper is swung out from the mouths, the mouth 17 is first opened, the valve body 28 keeping the mouth 18 closed initially. Consequently, a separate control is obtained for the conduits 15 and 16, in a manner such that a variation of the boundary layer control is attained longitudinally of the span of the wing, that is to say in such manner that a boundary layer actuation is switched in, commencing at the points of the wings, in order to manifest itself only later on at the inner portion of the wing, when the mouth 18 of the passage 16 is uncovered by the valve body 28.

The adjustment of the damper 27 may be effected manually or by means of automatically acting members, the adjustment of which is dependent on the speed of the airplane relatively to the ambient air. In principle, these members may be constructed as speed indicators. In the embodiment according to Fig. 1 an automatically operating device is shown by way of diagrammatic representation. This device consists broadly of a plunger or pressure plate 30, which is movable against the action of a spring 31 in a forwardly open cylinder 32 located in the front edge of the wing. The plunger is connected by a rod 33 to the one end of a double-armed lever 34 which is pivoted about a fixed shaft 35, and the other end of which is pivotally connected to a lever 36 secured to the damper 27. When the airplane has its normal velocity, the plunger 30 is kept depressed by the air pressure acting upon the same, so that the spring 31 will be compressed, the damper 27 being then closed. As the velocity of the airplane decreases, as in landing, the spring 31 is capable of moving the plunger forwardly so as to open the damper by means of the levers. The lower the velocity is, the more will the damper be opened, so as to adjust itself into an extreme position crosswise over the air inlet passage 29. The two dampers 27 will then close this passage entirely, so that all air to the compressor will be taken from the boundary layer through the conduits 15, 16.

The suction through the branch conduits 24 may be controlled separately, if the suction slots 26 of these conduits be placed as shown in Fig. 2, that is to say in the rear edge of the wing 2 in front of a wing flap 2'. The slots 26 will be opened only when the wing flaps are lowered for braking, the wing flap and the boundary layer control then cooperating with each other.

In the boundary layer control described with reference to Fig. 1, air is being sucked through the slots 21, 22 and 25, 26 from the upper side of the wing, so that the flow of air about the wing is improved and the carrying capacity of the wing is increased thereby. This suction by means of the compressor 4 may take place, according to the invention, while the jet propulsion unit operates at its maximum, inasmuch as the reactive force generated by the gases driving the turbine and escaping through the outlet 7 may be reduced at the same time or changed with respect to the direction thereof, which is effected with the aid of the deflector flaps 10, 11 mentioned hereinbefore. These flaps may be operated separately or with members coupled to the control dampers 27 for the passages 15, 16, as will be described more closely in the following.

According to Fig. 1, the boundary layer control is effected solely by the suction of air from the boundary layer. It is also appropriate, however, as shown in Figs. 3-4, to actuate the boundary layer by blowing air through suitable exhaust slots in the airplane, particularly in the covering of the wing, but, if desired, also in that of the fuselage. For this purpose conduits 38 may extend from the pressure side of the compressor 4 or from some other pressure outlet of the compressor to suitably arranged exhaust slots 39, to which the air is conveyed through a number of branch conduits 40. The slots 39 may also, as shown in Fig. 4, be located immediately in front of a wing flap 41 (or an aileron) or, as shown in Fig. 5 at 39', open on the lower side of the wing. In addition to the exhaust slots 39, there are also provided suction slots 43 in the embodiment according to Fig. 3, such suction slots being located further forward on the upper side of the wing. Air is being sucked through these slots over branch conduits 44 and a manifold 45 extending in the direction of the span to a mouth 46 in the wall of the unit behind the air-intake 3 on the suction side of the compressor 4. The mouth 46 may be controlled by means of dampers 47 which may be actuated by springs 48 or the like, in a manner such that they are kept folded out so as to cut off the air-intake 3 at a low speed of the airplane while being closed against the mouth 46 on account of the pressure from the air flowing through the air-intake at normal speed of flight. In the embodiment just described and shown in Fig. 3, sucking off of the boundary layer may obviously take place through the slots 43 simultaneously with boundary layer acceleration through the air blown out through the slots 39.

In the modification indicated in Fig. 5, two rows of branch conduits 44a, 44b are taken to extend from the suction conduit 45 for the suction of air from suction slots 43a, 43b located behind one another on the upper side of the wing at the rear edge thereof. Air is blown forward through the exhaust slots 39' arranged on the lower side of the wing. The object of this arrangement is to permit an increase of the circulation about the wing, when required, and also to permit a certain simultaneous braking effect.

The simultaneous sucking and blowing operations by means of the compressor brings about a reduction of the quantity of air supplied to the combustion chamber and, consequently, involves per se a reduction of the propelling force.

In the embodiment shown in Figs. 6 and 7, means are indicated for boundary layer control in the form of suction slots 50, which are arranged on the upper side of the wing 2, and of conduits 51 connected on each side of the unit to the suction side of the compressor 4. Dampers 52 are provided to control the mouths of the conduits 51 at the air inlet passage 29 to the compressor 4. Here, the means for the boundary layer control may be supplemented substantially as shown in Fig. 1 or 3. For the control of the direction and the magnitude of the propelling reaction force there is provided a deflector arrangement at the rear edge of the wing at the outlet for the reaction gases, said arrangement being, in principle, of the same construction as that described with reference to Fig. 1. Here, however, the deflector flaps 10, 11 are swingable about a shaft 12' extending in the direction of the span. They may be adjusted each per se, that is to say be extended with their rear edges against each other into the position designated by c, or they may be turned together into any of the positions d and e. They may also take intermediate positions between said extreme positions. In the position c, or in intermediate positions between said position and the completely retracted position (the initial position), the reaction gases are deflected so that an equal amount thereof will flow out obliquely forward and upward as obliquely forward and downward, a portion also escaping straight rearward in intermediate positions. In the position e, all gases are deflected obliquely forward and upward and in the position d obliquely forward and downward. This shifting of the deflecting means may be effected manually or automatically, preferably in connection with the landing of the airplane. The shifting is effected so that the deflector device is turned upward, for instance from the position d, in which the reaction gases flow obliquely downward and cause a lifting force at the rear edge of the wing, to the position e, when the airplane touches the ground, or immediately before, so that the gases are then directed obliquely upward and forward, entirely or in part. Hereby, the buoyancy on the wing is annihilated, the airplane being thus pressed to the ground.

Operating members for the shifting of the deflector or braking device may be coupled to operating members for the boundary layer control in various ways. The coupling may be such that the deflector flaps are folded out successively into the deflecting position or the braking position, according as the dampers are opened for the boundary layer control. In combination therewith, a coupling may be made use of, which is such that the actuation of the boundary layer is caused to cease, entirely or in part, when the deflector device is turned up, that is to say, is shifted, for instance, from the position d to the position e in Fig. 6, for example. Hereby, the air pressure on the wing will decrease, partly on account of cessation of the actuation of the boundary layer, and partly because of the fact that the gases flowing forward over the wing annihilate the buoyancy. The first mentioned coupling is shown diagrammatically in Figs. 8 and 9 and may be particularly conceived as applied to the embodiment according to Fig. 1. The second coupling referring to units in the wing according to Figs. 6 and 7 is shown in Fig. 10.

As will appear from Fig. 8, a hand lever 55 swingable about a fixed shaft 56 is connected, above said shaft, to the one end of two links 58, 59 through a link rod 57, said links having their other ends connected to the deflector flaps 10 and 11, respectively. Below the shaft 56, the lever 55 is pivotally connected with two arms 60, which are connected each with one of the dampers for the conduits 15, 16 for the boundary layer control. When the upper end of the lever is swung rearward, for instance into the position indicated by chain-dotted lines, the dampers 27 are opened simultaneously with the folding-out of the deflector flaps 10, 11 into a deflecting position (chain-dotted lines), where the gases may flow forwardly, entirely or in part, as indicated by the arrows 61. Hereby a simultaneous boundary layer control and reactive braking will be obtained. This operation is carried out in landing immediately before the airplane touches the ground. At the very moment of touching the ground it may be found suitable to disconnect the boundary layer control, while braking is continued and augmented, if desired. To this end, the connection of the lever 55 with the arms 60 may be disconnectible, manually or automatically, in the latter case for instance through an impulse from the undercarriage or from some scanning or feeling member suspended from the airplane. The disengageable connection between the lever 55 and the arms 60 is shown in a perspective view in Fig. 9, while an example of the arrangement of an impulse from the undercarriage is shown in a portion of Fig. 10, a modification thereof being shown in Fig. 11.

According to Fig. 9, the lever 55 is bifurcated at the bottom, a coupling catch 65 being mounted on a bolt 64 between the shanks 63 of the fork, the hook-shaped end of which catch clasps about a projection 66 on the end of the one arm 60. A spring 67 inserted between the other end of the catch and the fork tends to keep the catch in engagement with said projection. Secured to the fork is an electromagnet 68, which may be connected through wires 69, 70 to a contact device, by means of which the circuit may be closed over the electromagnet. This contact device may be constructed as described with reference to Fig. 10 or 11. When the circuit is closed, the hook will be attracted and raised into the position indicated by chain-dotted lines so as to be disengaged from the projection 66 while releasing the arms 60.

The arrangement shown in Fig. 10 to fold the deflector flaps 10, 11 out and in and to swing them upward and downward about the common axis of rotation 12' is constructed in the following manner. Pivotally secured to the side piece of each deflector flap is the one end of an arm 72, the other end of these arms being mutually connected by a bolt 73. At a point between the ends of each arm, a forward directed link rod 74 is pivotally connected with the same. The fore ends of the link rods 74 are connected with each end of a transverse rod 75. Extending through the centre of the latter is a forwardly directed shaft 76 the fore end of which is formed into a screw entering the rear end of a rod 77 provided with a threaded bore. Secured on the fore end of the rod 77 is a toothed segment 78, which is actuated by a pinion 79 on a shaft 80 of an electric motor 81, said shaft extending at right angles to the rod 77. The other end of the motor shaft 80 actuates, over a bevelled gearing 82, the shaft of the damper 52 (compare Fig. 7) controlling the conduits 51 from the suction slots 50 in the wing 2. The shaft 76 is driven by a motor 83, which is suspended so as to permit displacement of the shaft in the longitudinal direction thereof as well as a swinging movement of the shaft about a geometric axis of rotation extending in the direction of the span through the mounting point of the transverse rod 75 on the shaft 76. The motor 81 is connected into a circuit comprising a source of current 84, wires 85, 86 and 87 and a pair of contacts 88, 89 of which the one contact 88 is secured to the upper and the other contact 89 to the lower one of the two telescopically cooperating members 90 and 91 respectively constituting the legs of the undercarriage. A wheel of the under-carriage is denoted by 92.

The arrangement shown in Fig. 10 operates in the following manner:

It is assumed that the deflector flaps 10, 11 take initially the position shown by full lines in Fig. 10, the flow of reaction gases having been deflected so as to be directed substantially obliquely forward and downward. This position is the one existing immediately before the airplane touches the ground. The dampers 52 are then folded out so as to cut off the forward directed air-intake, while the conduits 51 are kept open, so that air is sucked from the boundary layer of the wings. When the airplane touches the ground, the members 90, 91 of the under-carriage are telescoped into each other, so that the contacts 88, 89 close the circuit over the motor 81. The latter will then swing up the fore end of the rod 77 by means of the pinion 79 and the toothed segment 78, so that the transverse rod 75 is moved obliquely into the position marked by dash lines 75'. Hereby the deflector flaps 10, 11 will be turned through the agency of the link rods 74 about the common axis 12' into the position shown by chain-dotted lines. This involves that the flow of exhaust gases, which was previously directed downward, is now directed upward above the upper side of the wing. While this swinging of the flaps 10, 11 takes place, the motor 81 turns the damper 52 over the gearing 82, so that this damper is swung from the position shown by full lines inward toward the mouth of the passage 51 so as to close the latter. The boundary layer control will thus be interrupted. The buoyancy on the upper side of the wing is annihilated by the exhaust gas flow, which in connection with the other measures of expediency results in that the airplane touches the ground forcibly.

The deflector flaps are folded in and out with the aid of the motor 83, which is adapted to displace the transverse rod 75 forward or rearward by the fact that the screw 76 when rotated by means of the motor is retracted into or projected from the rod 77 provided with inner screw threads.

In the modification according to Fig. 11, the contacts 88, 89 are closed by a suspended feeler 94, preferably in the form of a resilient rod, which is swingable about a shaft 95 and carries the contact 88 on the upper end thereof. When the rod abuts the ground so as to swing rearward with its lower end, the contacts are closed, so that the deflector flaps will be shifted in the manner described with reference to Fig. 10.

Although the arrangement described with reference to Fig. 10 has been shown as applied to units built into a wing, the same arrangement may be provided, in applicable parts, in units which are arranged centrally on the fuselage according to Fig. 1.

Fig. 12 shows an embodiment, wherein the reaction gases are not deflected by means of flaps but by being directed into forward directed passages opening forward into the air-intakes 3. Such a passage 100 is provided on each side of the unit. Provided in the mouth between the central gas exhaust tube 7 and these passages 100 are valve members or dampers 101, 101', which may be operated automatically or manually, the same being kept closed, for instance in normal operation, by means of a spring 102, as in the damper 101, or being provided with an arm 103, which is connected to a manually operable rod 104 or the like, as shown in the damper 101'. The outlet of the passages 100 into the air-intakes 3 may, like the latter, be controlled on each side by means of common valve members or dampers 105 arranged on the same shaft 106 as the dampers 107 for the boundary layer control in the mouth of the passages 108 from suction slots 109 in the airplane wing. The dampers 105 may be swung from the position shown by full lines, wherein they close the mouths of the passages, toward the inner wall of the air-intake so as to cut off the air supply from the front through the air intake 3. In the normal outlet 9 of the unit there is provided an axially displaceable conical member 110, which may be caused to close against a seat 111 on the wall of the exhaust passage.

In normal operation without braking, the dampers take the positions shown by full lines, the rear as well as the front mouths of the passages 100 being then closed. If the airplane is to be braked, for instance in landing, the conical throttle member 110 is moved rearward, so that the outlet 9 is closed more or less. By reason of the increase of the pressure in the tube 7 in front of the throttle member, the damper 101 will be opened against the action of the spring 102, so that the gases will instead flow out forward so as to cause rearward directed reaction forces. The dampers 105 are shifted by the gas flow, so that the air-intakes 3 are closed. At the same time, the dampers 107 secured on the same shaft 106 are swung out so as to open the mouths of the passages 108 for the boundary layer control. Consequently, boundary layer control and braking will be possible at the same time.

The forms of embodiment described may be supplemented so that the operating members for the control of the actuation of the boundary layer and/or the reactive braking and the lateral exhaust of the gases are associated, entirely or in part, with one or more of the control levers (rudder pedals) for the operation of the airplane or with the control member for the reaction motor ("the gas lever") or for the number of revolutions thereof.

Furthermore, there may be provided, in addition to the lever or the like adapted for the control of the degree of the actuation of the boundary layer and/or the reactive braking, coupling devices adapted to connect the braking device with guide members for the course steering of the airplane, so that the braking effect may be distributed to the right and left, according as these throttle members are adjusted for a corresponding change of the course.

What I claim is:

1. In an aircraft, an internal combustion turbine unit including means providing an air intake passage, a compressor, a combustion chamber, a turbine coupled to said compressor and a rearwardly directed jet discharged nozzle connected in series to deliver air for combustion under pressure from said compressor to said combustion chamber and gaseous products of combustion from the combustion chamber through said turbine and jet discharge nozzle for propulsion of the aircraft; an exterior aircraft surface having slots therein, interior duct means extending from the compressor to said slots in the exterior surface to effect boundary layer control, whereby the boundary layer control effect may be increased by increase in speed of the turbine unit; and adjustable deflector means movable into the path of combustion gases passing from said combustion chamber through said jet discharge nozzle to direct a portion of the propulsive gases forwardly to neutralize the potential increase in propulsive effect due to increase in speed of the turbine unit for boundary layer control.

2. In an aircraft, an internal combustion turbine unit including means providing an air intake passage, a compressor, a combustion chamber, a turbine coupled to said compressor and a rearwardly directed jet discharge nozzle connected in series to deliver air for combustion under pressure from said compressor to said combustion chamber and gaseous products of combustion from the combustion chamber through said turbine and jet discharge nozzle for propulsion of the aircraft; an exterior aircraft surface having slots therein, interior duct means extending from the suction side of the compressor to said slots in the exterior surface to effect boundary layer control, whereby the boundary layer control effect may be increased by increase in speed of the turbine unit; and adjustable deflector means movable into the path of combustion gases passing from said combustion chamber through said jet discharge nozzle to direct controlled amounts of said gases forwardly to produce a braking force on the forward motion of the aircraft variable from zero to a maximum depending on the position of adjustment of said deflector means to neutralize the potential increase in propulsive effect due to increase in speed of the turbine unit for boundary layer control.

3. In an aircraft, an internal combustion turbine unit including means providing an air intake passage, a compressor, a combustion chamber, a turbine coupled to said compressor and a rearwardly directed jet discharge nozzle connected in series to deliver air for combustion under pressure from said compressor to said combustion chamber and gaseous products of combustion from the combustion chamber through said turbine and jet discharge nozzle for propulsion of the aircraft; an exterior aircraft surface having slots therein, interior duct means extending from the pressure side of the compressor to said slots in the exterior surface to effect boundary layer control, whereby the boundary layer control effect may be increased by increase in speed of the turbine unit; and adjustable deflector means movable into the path of combustion gases passing from said combustion chamber through said jet discharge nozzle to direct controlled amounts of said gases forwardly to produce a braking force on the forward motion of the aircraft variable from zero to a maximum depending on the position of adjustment of said deflector means to neutralize the potential increase in propulsive effect due to increase in speed of the turbine unit for boundary layer control.

4. An aircraft as claimed in claim 1, said deflector means comprising a throttling member for shutting off the gas outlet rearward through said jet discharge nozzle and means providing a passage directed substantially forward to conduct the combustion gases from a point ahead the outlet but aft the compressor and out to the atmosphere.

5. An aircraft as claimed in claim 2, said deflector means comprising a throttling member for controlling and shutting off the gas outlet rearward through said jet discharge nozzle, means providing a passage directed substantially forward and connecting the gas outlet of the unit with the air intake thereof, and a control device to shut off the air supply to the unit through said intake whereby the air to the compressor is drawn from the boundary layer simultaneously with the flow of the combustion gases out forward through the air intake.

6. An aircraft as claimed in claim 2, said deflector means comprising a throttling member for controlling and shutting off the gas outlet rearward through said jet discharge nozzle, means providing a passage directed substantially forward and connecting the gas outlet of the unit with the air intake thereof, and a control valve common for the air intake and said passage and mounted to be opened by the gases flowing through the passage to the air intake and to simultaneously close the passage from the air intake to the compressor.

7. In an aircraft the combination of a jet propulsion unit including a compressor, a combustion chamber and an outlet passage for the combustion gases, an exterior aircraft surface having slots therein, ducts connecting said slots to the intake side of said compressor whereby to utilize said compressor for boundary layer control, a throttle member in the outlet passage, a passage extending from the outlet passage and opening forward, valve means mounted between said passages and adapted to be opened due to the increase of pressure created as a result of throttling the outlet passage by said throttling member.

8. In an aircraft the combination of a jet propulsion unit including a compressor, a combustion chamber and an outlet passage for the combustion gases, an exterior aircraft surface having slots therein, ducts connecting said slots to the intake side of said combpressor whereby to utilize said compressor for boundary layer control, a throttle member in the outlet passage, a passage extending from the outlet passage and opening forward, a valve for controlling the communication between said passages and an operating member for manual control of said valve.

9. In an aircraft having a wing, an internal combustion turbine unit carried by the aircraft including means providing an air intake passage, a compressor, a combustion chamber, a turbine coupled to the compressor and a rearwardly directed jet discharge nozzle connected in series to deliver air for combustion under pressure from said compressor to said combustion chamber and gaseous products of combustion from the combustion chamber through said turbine and jet discharge nozzle for propulsion of the aircraft, said wing having slots spaced along the length and opening on the surface thereof, conduits extending through the wing connecting said compressor with said slots for boundary layer control whereby the boundary layer control may be increased by increase in speed of the turbine unit, means for controlling flow through said conduits to vary the boundary layer control at different points along the length of said wing, adjustable deflector means movable into the path of combustion gases passing from said combustion chamber through said jet discharge nozzle to direct at least a portion of said gases forwardly to produce a braking force on the aircraft, and means for adjusting the position of said deflector means to control the amount of said braking force to neutralize the potential increase in propulsive effect due to increase in speed of the turbine unit for boundary layer control.

10. An aircraft as claimed in claim 9, in which the means for controlling flow through the conduits connecting the compressor to the wing slots comprises a member responsive to the pressure of the ambient air whereby to control the flow automatically in accordance with the speed of the aircraft.

11. An aircraft as claimed in claim 9 in which the means for controlling flow through the conduits connecting the compressor and wing slots comprises damper members responsive to the pressure of air in the air intake passage.

12. In an aircraft having a wing, an internal combustion turbine unit carried by the aircraft including means providing an air intake passage, a compressor, a combustion chamber, a turbine coupled to the compressor and a rearwardly directed jet discharge nozzle connected in series to deliver air for combustion under from said compressor to said combustion chamber and gaseous products of combustion from the combustion chamber through said turbine and jet discharge nozzle for propulsion of the aircraft, said wing having a plurality of slots in spaced relation opening on the surface thereof, a conduit connecting some of said slots with the suction side of the compressor, another conduit connecting other of said slots with the pressure side of the compressor, whereby to effect boundary layer control by simultaneous removal of air by suction and blowing through the respective slots, adjustable deflector means movable into the path of combustion gases passing from said combustion chamber through said jet discharge nozzle to direct at least a portion of said gases forwardly to produce a braking force on the aircraft, and means for adjusting the position of said deflector means to control the amount of braking force, the arrangement being such that the boundary layer control effect may be increased by increase in speed of the turbine unit and the braking force may be adjusted to neutralize the potential increase in propulsive thrust due to increase in speed of the turbine unit for increased boundary layer control.

13. An aircraft as claimed in claim 12 in which the slots connected to the suction side of the compressor are positioned forwardly of the slots connected to the pressure side thereof.

14. An aircraft as claimed in claim 12 in which the slots connected with the pressure side of the compressor open on the undersurface of the wing and are forwardly directed.

15. In an aircraft the combination of a wing having surface slots therein, a jet propulsion unit carried by the wing including a combustion chamber, an air compressor for the supply of combustion air under pressure to said combustion chamber for burning with fuel to produce the propulsion gases and a rearwardly directed jet discharge nozzle for said gases, conduits connecting the surface slots in said wing to said compressor to control the boundary layer at the wing through the compressor whereby the boundary layer control may be increased by increase in speed of the jet propulsion unit, movable deflecting means associated with the jet discharge nozzle adjustable to a position for deflecting the propulsion jet downwardly and forwardly beneath the wing, and means for adjusting the position of said deflecting means to neutralize the potential increase in propulsive effect due to increase in speed of the jet propulsion unit for boundary layer control.

16. In an aircraft, the combination of a wing having surface slots therein, a jet propulsion unit carried by the wing including a combustion chambers, an air compressor for the supply of combustion air under pressure to said combustion chamber for burning with fuel to produce the propulsion jet gases and a rearwardly directed jet discharge nozzle for said gases, conduits connecting said surface slots in the wing to said compressor to control the boundary layer at the wing through said compressor whereby the boundary layer control may be increased by increase in speed of the jet propulsion unit, deflecting means associated with the jet discharge nozzle adjustable to a position for deflecting the propulsion jet forwardly for braking purposes and coupled operating members for adjusting the position of said deflecting means and for controlling the passage of air to said compressor through said conduits whereby to neutralize the potential increase in propulsive effect due to increase in speed of the jet propulsion unit for boundary layer control.

17. In an aircraft having a wing, an internal combustion turbine unit carried by the aircraft including means providing an air intake passage, a compressor, a combustion chamber, a turbine coupled to the compressor and a rearwardly directed jet discharge nozzle connected in series to deliver air for combustion under pressure from said compressor to said combustion chamber and gaseous products of combustion from the combustion chamber through said turbine and jet discharge nozzle for propulsion of the aircraft, said wing having slots opening on the upper surface thereof, conduits extending through the wing connecting said compressor to said wing slots for boundary layer control, control members for regulating the flow through said conduits, reaction braking means comprising adjustable deflector members mounted adjacent the outlet of said jet discharge nozzle, operating means for adjusting the position of said deflector members to braking positions to deflect the gases issuing from said nozzle forward entirely above, entirely below or partly above and partly below said wing and connections between the control members for regulating the flow through said conduits for boundary layer control and said operating means for adjusting said deflector members effective to reduce the boundary layer control when said deflector members are adjusted to direct the gases from said discharge nozzle forwardly above the wing whereby to reduce the buoyancy of the wing partly by reduction of the actuation of the boundary layer and partly by the direction of said gases forwardly over the upper surface thereof.

18. An aircraft having a wing, an internal-combustion turbine unit carried by the wing, a means providing a streamlined intake passage for said unit, said means extending from an exterior surface of the aircraft to said unit and including a wall, a shutter means normally forming a part of the wall of said intake passage but movable to a position to partially block said passage so as to cause a relative depression in the pressure of the fluid in said passage downstream of said shutter means, and a means in said wing providing a passage between an opening in the upper surface of the wing near the wing tip and an opening in the wall of said intake passage, which last named opening is normally closed by said shutter means but which is uncovered, when said shutter means is moved as aforesaid, to place that portion of said intake passage which is downstream of said shutter means in communication with said wing tip opening, whereby to remove some of the boundary layer from the upper surface of the wing tip.

19. An aircraft having a wing, an internal-combustion turbine unit carried by the aircraft, means providing an air intake passage for said unit extending from an exterior surface of the aircraft and including a wall, shutter means normally forming part of the wall of said intake passage but movable to a position to partially block said passage so as to cause a relative depression in the pressure of fluid in said passage downstream of said shutter means, and means providing a passage between an opening in the upper surface of the wing and an opening in the wall of said intake passage, which last-named opening is normally closed by the shutter means, but which is uncovered when the shutter means is moved as aforesaid, to place that portion of the intake passage which is downstream of said shutter means in communication with said wing opening, whereby to remove some of the boundary layer from the upper surface of said swing.

20. An aircraft having a wing, an internal-combustion turbine unit carried by the wing, a means providing a streamlined intake passage for said unit, said means extending from an exterior surface of the aircraft to said unit and including a wall, a shutter means normally forming a part of the wall of said intake passage but movable to a position to partially block said passage so as to cause a relative depression in the pressure of the fluid in said passage downstream of said shutter means, an aircraft control member, a connection between said shutter means and said control member whereby said shutter means is moved as aforesaid when said control member is moved in one direction and a means in said wing providing a passage between an opening in the upper surface of the wing near the wing tip and an opening in the wall of said intake passage, which last-named opening is normally closed by said shutter means but which is uncovered when said shutter means is moved as aforesaid, to place that portion of said intake passage which is downstream of said shutter means in communication with said wing tip opening, whereby to remove some of the boundary layer from the upper surface of the wing tip.

21. An aircraft having wings, an internal-combustion turbine unit carried by the aircraft, means providing a streamlined intake passage for said unit, said means extending from an exterior surface of the aircraft to said unit and including a wall, oppositely-disposed shutters which normally form separate parts of the wall of said intake passage but which are movable to a position to partially block said passage so as to cause a relative depression in the pressure of the fluid in said passage downstream of said shutters, and means providing passages between openings in the upper surfaces of the wings and openings in said separate parts of the wall of said intake passage, which last-mentioned openings are normally closed by said shutters respectively but which are uncovered, when said shutters are moved as aforesaid to place that portion of said intake passage which is downstream of said shutters in communication with said wing openings, whereby to remove some of the boundary layer from the upper surface of said wings.

BO KLAS OSKAR LUNDBERG.

REFERENCES CITED

The following references are of record in the file of this patent:

UNITED STATES PATENTS

| Number | Name | Date |
|---|---|---|
| 1,493,280 | Rees | May 6, 1924 |
| 1,854,043 | Körner | Apr. 12, 1932 |
| 2,024,274 | Campini | Dec. 17, 1935 |

(Other references on following page)

UNITED STATES PATENTS

| Number | Name | Date |
|---|---|---|
| 2,041,792 | Stalker | May 26, 1936 |
| 2,049,572 | Stakler | Aug. 4, 1936 |
| 2,071,221 | Schramm | Feb. 16, 1937 |
| 2,173,273 | Seversky | Sept. 19, 1939 |
| 2,219,234 | Messerschmitt | Oct. 22, 1940 |
| 2,383,385 | Heintze | Aug. 21, 1945 |
| 2,396,911 | Anxionnaz et al. | Mar. 19, 1946 |
| 2,402,065 | Martin | June 11, 1946 |
| 2,407,185 | Stalker | Sept. 3, 1946 |

FOREIGN PATENTS

| Number | Country | Date |
|---|---|---|
| 171,600 | Great Britain | Nov. 24, 1921 |
| 479,598 | Great Britain | Feb. 7, 1938 |
| 512,064 | Great Britain | Aug. 29, 1939 |
| 518,663 | Great Britain | Mar. 5, 1940 |
| 733,661 | France | July 12, 1932 |

OTHER REFERENCES

Ser. No. 396,458, Richard (A. P. C.), published May 25, 1943.

Certificate of Correction

Patent No. 2,568,813 September 25, 1951

BO KLAS OSKAR LUNDBERG

It is hereby certified that error appears in the printed specification of the above numbered patent requiring correction as follows:

Column 12, line 7, after "under" insert *pressure*;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*